(12) United States Patent
Hulseman et al.

(10) Patent No.: US 8,814,954 B2
(45) Date of Patent: Aug. 26, 2014

(54) METHOD OF MANUFACTURING PRODUCTS HAVING A METAL SURFACE

(75) Inventors: Ralph A. Hulseman, Greenville, SC (US); David Mammarella, Greenville, SC (US); Andrew H. Cannon, Columbia, SC (US); William P. King, Champaign, IL (US)

(73) Assignee: Hoowaki, LLC, Pendleton, SC (US)

( * ) Notice: Subject to any disclaimer, the term of this patent is extended or adjusted under 35 U.S.C. 154(b) by 691 days.

(21) Appl. No.: 12/869,603

(22) Filed: Aug. 26, 2010

(65) Prior Publication Data

US 2011/0089604 A1    Apr. 21, 2011

Related U.S. Application Data

(63) Continuation-in-part of application No. 12/813,833, filed on Jun. 11, 2010, now Pat. No. 8,720,047.

(60) Provisional application No. 61/237,119, filed on Aug. 26, 2009.

(51) Int. Cl.
*H01L 21/00* (2006.01)
*H01L 21/64* (2006.01)

(52) U.S. Cl.
USPC ............. 29/25.01; 29/840; 29/830; 29/457; 29/890.03; 29/33 H; 264/219; 264/299; 264/313; 228/183

(58) Field of Classification Search
USPC ............. 29/25.01, 825, 830, 457, 890.03, 29/890.035, 33 H, 840; 264/219, 220, 224, 264/225, 226, 227, 299, 313, 316, 320; 228/183
See application file for complete search history.

(56) References Cited

U.S. PATENT DOCUMENTS

| | | | | |
|---|---|---|---|---|
| 4,923,572 A * | 5/1990 | Watkins et al. | | 205/69 |
| 6,224,816 B1 * | 5/2001 | Hull et al. | | 264/401 |
| 6,663,820 B2 * | 12/2003 | Arias et al. | | 264/496 |
| 6,925,711 B2 * | 8/2005 | Kilmer et al. | | 29/890.053 |
| 2005/0206034 A1 * | 9/2005 | Yokoyama et al. | | 264/219 |

* cited by examiner

*Primary Examiner* — Peter DungBa Vo
*Assistant Examiner* — Jeffrey T Carley
(74) *Attorney, Agent, or Firm* — McNair Law Firm, P.A.; Douglas W. Kim; Douglas L. Lineberry

(57) ABSTRACT

The method for manufacturing products having a metal surface by imparting microfeatures onto the metal surface. The method if further described as the steps of: creating a transfer tool from a microstructured intermediate fabricated from a microstructured prototype having microfeatures; and, transferring the microfeatures to said metal surface using the transfer tool.

24 Claims, 8 Drawing Sheets

METHOD OF MANUFACTURING PRODUCTS HAVING A METAL SURFACE

CROSS REFERENCE TO RELATED APPLICATION

This application claims the benefit of and the priority from: provisional application filed Aug. 26, 2009 under Application No. 61/237,119; utility application filed Jun. 11, 2010 under application Ser. No. 12/813,833 which claims the benefit of and priority of PCT application filed in May 8, 2009 under Application Number PCT/US09/43307 and PCT application filed on Jun. 7, 2009 under Application Number PCT/US09/049,565 incorporated by reference.

BACKGROUND OF THE INVENTION

1) Field of the Invention

The present invention relates to a method of manufacturing products having a metal surface and more specifically, to methods and techniques for creating microstructures having microfeatures on the metal surface of products including metal foils, thin metal foils such as aluminum, heat exchangers and the like to impart properties to the foils including hydrophobic, superhydrophobic, hydrophillic, superhydrophillic, and oleophobicity.

2) Description of Related Art

Microstructured surfaces are known to have certain properties that do not exist in flat or non-microstructured surfaces For example, superhydrophobic surfaces easily repel water, and have further been shown to self-clean, mitigate ice formation, and reduce fouling properties. Superhydrophobic surfaces can also be created physically through the presence of microstructures formed on the surface of the material. These microstructures are generally formed at the $10^{-6}$ m scale and can trap a layer of air between themselves and a water drop. (It should be noted that the surface can still be hydrophobic even without a trapped air layer). The drop is prevented from sinking between the structures and is forced into an extreme contact angle with the surface. Water on these surfaces is extremely mobile and rolls away from the surface easily, carrying large dust particles and other contaminants with it. These surfaces have also been shown to repel more viscous fluids, such as honey or syrups.

Other properties that can be imparted to metal surfaces include providing hydrophobic (of water to exclude non-polar molecules, which leads to segregation of water and non-polar substances, to repel water), hydrophillic (capable of hydrogen bonding, enabling it to dissolve more readily in water than in oil or other hydrophobic solvents, to attract water), superhydrophillic, and oleophobic (repels oil).

While the prior art is replete with coating compositions and techniques, these techniques involve chemical processes to produce microfeatures on a metal surface. Unfortunately, there are many disadvantages to the use of chemical processes to modify a metal surface, including the inability to provide for consistently formed microfeatures. Once example of the disadvantages of chemical processes is illustrated in the publication titled *Super-hydrophobic surface treatment as corrosion protection for aluminum in seawater*, published in Corrosion Science on May 7, 2009. This publication describes that an underwater super-hydrophobic surface can be applied in the corrosion protection using melting myristic acid ($CH_3(CH_2)_{12}COOH$) absorbed onto the anodized aluminum. However, use of acids and other chemicals, including myristic acid, complicates the manufacturing process by requiring specific storage techniques (keeping it away from heat and other sources of ignition), specific handling techniques (using a hood), and by posing a health risk as myristic acid can be harmful to humans in the case of ingestion, skin contact and eye contact. Further, degradation of products containing acids such as myristic acid occurs when stored for long terms.

An article titled *Creating micro-scale surface topology to achieve anisotropic wettability on an aluminum surface* published on Jun. 29, 2006 in Journal of Micromechanics and Microengineering, describes a technique for fabricating micropatterned aluminum surfaces with parallel grooves 30 μm wide and tens of microns in depth. Traditional photolithographic techniques were used to produce the surface features described in this publication. However, this technique only discloses the process for providing grooves in the surface and does not describe the creation of microstructures as in the present invention. Further, the surface features are two dimensional patterns and not the three dimensional patterns as can be achieved by the present invention, thereby significantly diminishing the physical properties that can be imparted onto a product with a metal surface. Further, the use of photolithographic and etching techniques do not lend themselves to mass production as required in industry, especially for the mass production of products such as aluminum foil.

Another technique still in development is to provide microfeatures created chemically by adding a coating. Significant disadvantages exist with using coating techniques, particularly with attempting to impart superhydrophobic properties since these coatings wear off easily, are costly to manufacture, often environmentally destructive and require expensive materials, special knowledge and special equipment, and cannot be applied to app materials. Coatings also are subject to strength of the bond between the coating and the underlying bulk material. Other alternatives to this invention are laser etching and material deposition. Both of these methods are costly, require specialized equipment, are limited as to material used, cannot be easily applied to large surface areas and require extreme precision, especially to create superhydrophobic surfaces.

Therefore, it is an object of this invention to apply microfeatures to a product having a metal surface, including thin metal foils such as aluminum or copper.

It is another object of the present invention to provide microstructures on the surface of thin metal foils to impart superhydrophobic properties to the material.

It is another object of the present invention to provide microstructures on the surface of thin metal foils in a cost effective, simplified and environmentally safe manner.

SUMMARY OF THE INVENTION

The above objectives are accomplished according to the present invention by providing a method for manufacturing a product having a metal surface comprising the steps of: fabricating a microstructured prototype having microfeatures selected from a set of predefined patterns of microstructures; creating a microstructured intermediate from said microstructured prototype so that a negative of said microfeatures are transferred to said microstructured intermediate; creating a transfer tool having said microfeatures from said microstructured intermediate; and, transferring said microfeatures to said metal surface by performing the steps from the group consisting of: rolling, stamping, casting, embossing or imprinting said microfeatures to said metal surface using said transfer tool so that a negative of said microfeatures are imprinted on the metal surface of said product so that said metal surface includes microstructures.

The microstructured prototype can be a silicon wafer or a polymer and can be created by molding or casting said polymer using said microstructured material from said microstructured prototype. The microstructured intermediate can be made from the group comprising of thermoplastic, thermoplastic polymer, thermoset, and rubber.

The transfer tool can be a cylindrical engineered polymer used for roll milling; and, transferring said microfeatures to said metal surface of said product includes the steps of rolling said microfeatures to said metal surface using said transfer tool so that a negative of said microfeatures are imprinted on said metal surface of said product.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
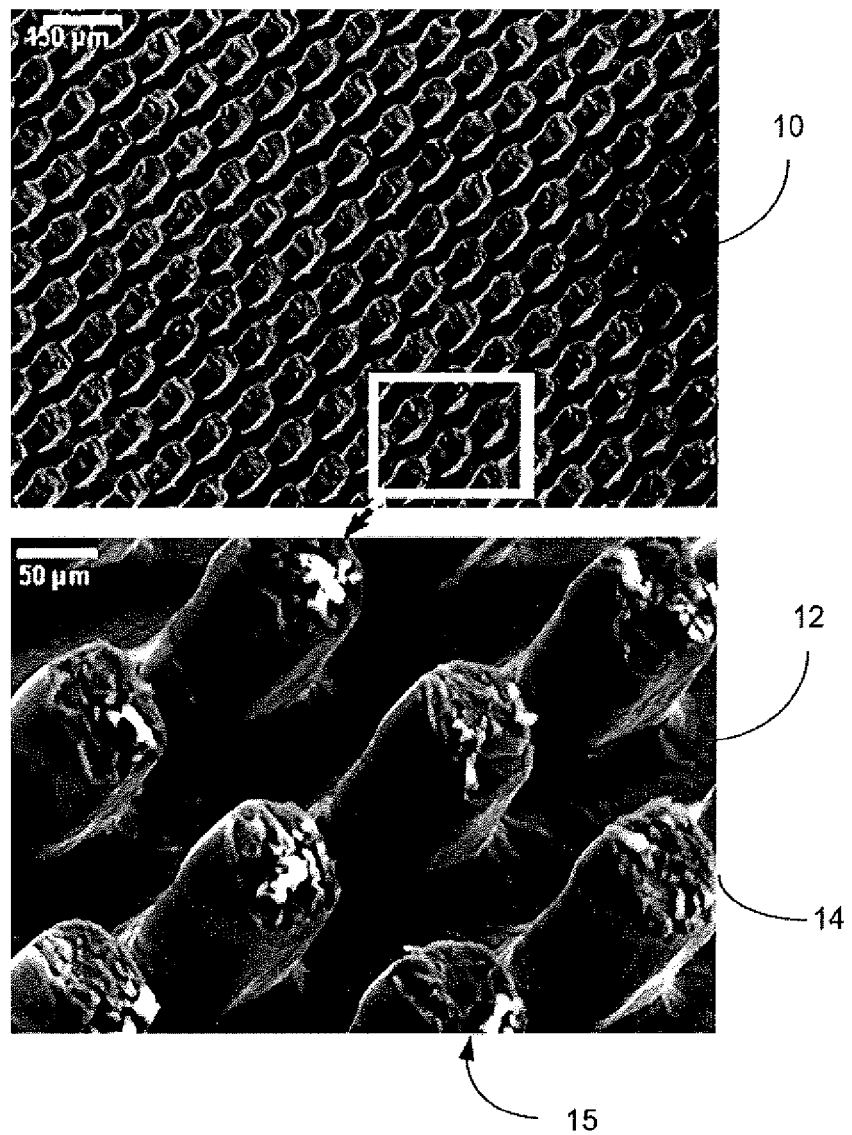
FIG. 1 is an image, of a rolled aluminum foil containing microstructures according to the present invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

Reference is made to international PCT applications PCT/US09/43306 (entitled Methods for Fabricating Microstructures, filed May 9, 2009 with the US Receiving Office) and PCT/US09/43307 (entitled Flexible Microstructured Superhydrophobic Materials, filed May 9, 2009 with the US Receiving Office), which are hereby incorporated in this application in their entireties to the extent each reference is at least partially not inconsistent with the disclosure in this application (for example, a reference that is partially inconsistent is incorporated by reference except for the partially inconsistent portion of the reference). These applications describe in detail the methods and techniques for forming microstructures on a mold.

With reference to the drawings, the invention will now be described in more detail. According to the present invention, a technique is provided for manufacturing superhydrophobic products having a metal surface through microstructure formation on the metal surface. In summary, a product is cold forged to include microstructures to impart superhydrophobic properties by calendar rolling using a two-roll mill or the like. Roller surfaces are made of metal or engineering polymer having a defined microstructure which transfers the microstructures from the roller to the metal surface under pressure.

Referring to FIG. 1, magnified image 10, showing a scale of 150 μm, is of a metal surface, such as with aluminum foil, having a series of nano-sized projections extending from the surface of the metal surface after being subject to the method of manufacturing the metal surface using a roller under pressure. The highlighted box represents the area of magnified image 12 further illustrating the series of micro-sized projections. In this embodiment, these microstructured projections create a superhydrophobic surface on the foil. Each of the projections can have a roughed upper surface 14 that can be produced through the manufacturing process of this invention.

Figure 2A:
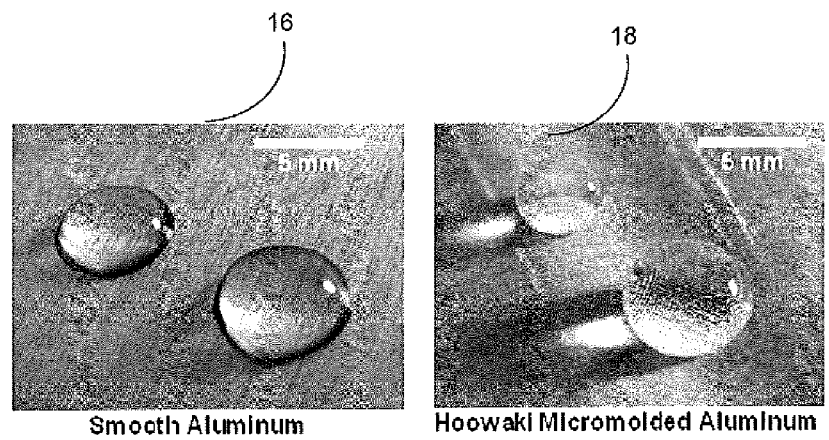
FIG. 2A is an image of water drops on a non-microstructured metal surface and a microstructured metal surface.
Figure 2B:
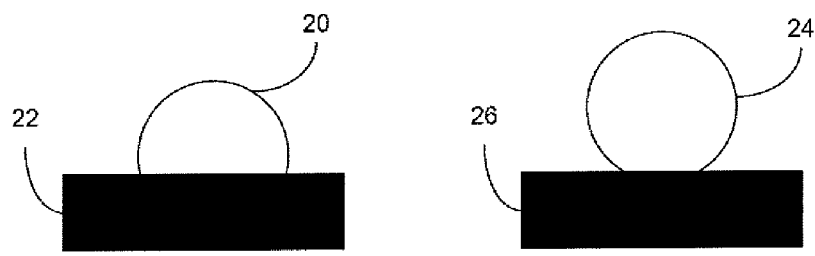
FIG. 2B is a schematic of water drops and corresponding contact angles on a non-microstructured metal surface and a microstructured metal surface.

In general, the superhydrophobic properties of a surface are measured by a water drop's contact angle with the surface and by the adhesion forces between the drop and the surface. Referring to FIG. 2A, water drops are shown on a non-microstructured product having a metal surface such as a sheet of metal aluminum foil. As shown in 16, water on smooth aluminum wets the surface and forms hemispherical drops. As shown in 18, water on microstructured aluminum forms beads and is highly mobile. Referring to FIG. 2B, the water drop 20 on a non-microstructured sheet of aluminum foil 22 results in a contact angle of approximately 101° while a water drop 24 on a microstructured sheet of aluminum foil 26 results in a contact angle of approximately 140°. As shown, the contact angle of the water is increased when microstructures are added to the surface to create a superhydrophobic surface.

Figure 3:
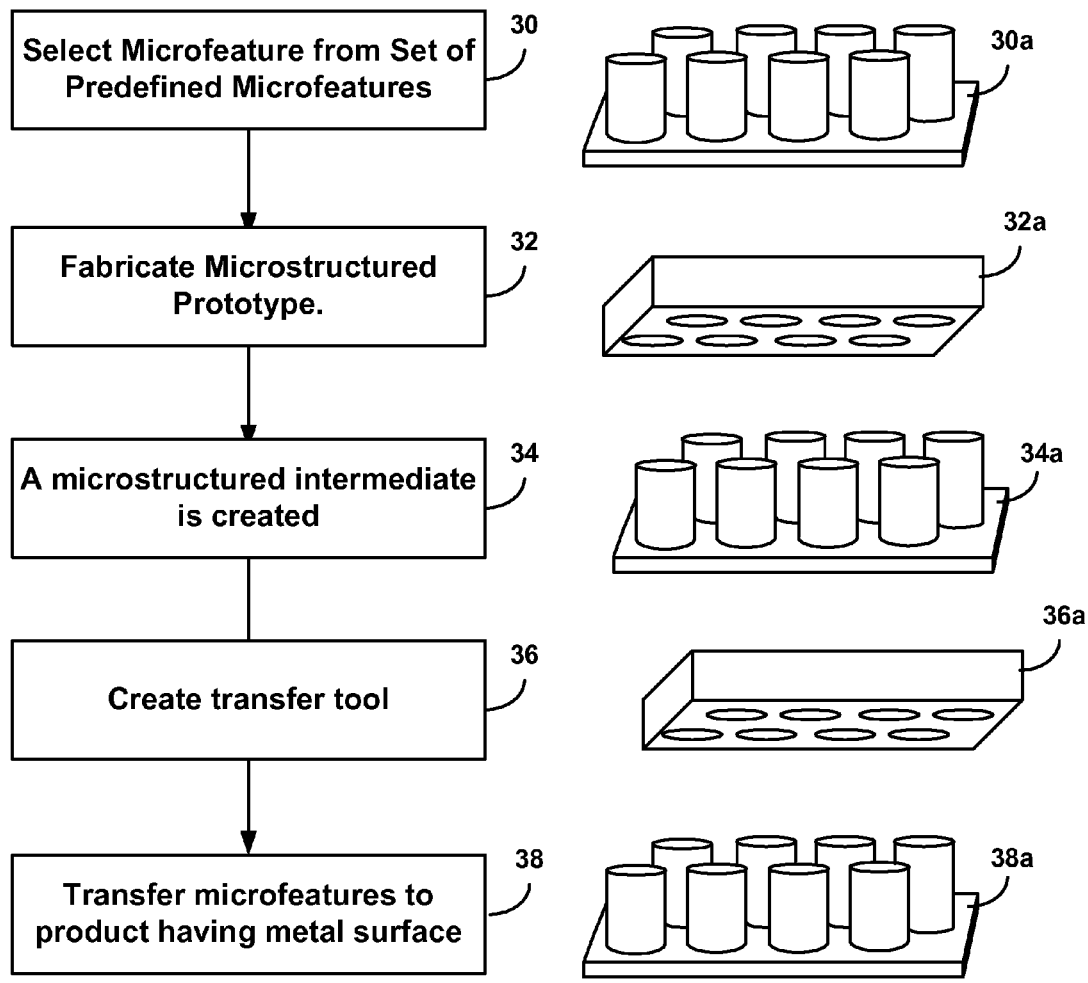
FIG. 3 is a flowchart and schematic of the invention.

Referring to FIG. 3, one embodiment of the present invention is illustrated. A particular pattern of microstructures 30a is selected from a set of predefined patterns of microstructures at 30. A microstructured prototype 32a is fabricated at 32 using the selected microfeature 30a so that the microstructured prototype has the microfeature on its surface. A microstructured intermediate 34a is created at step 34. The microstructured intermediate can be made from thermoplastic, thermoplastic polymer, thermoset, or rubber. The microfeatures of the microstructured intermediate is used to create transfer tool 36a at step 36. At step 38, the transfer tool is used to transfer the microfeatures onto a product 38a having a metal surface. The process of transferring the microfeature using the metal tool can be performed by rolling, stamping, casting, embossing or imprinting.

In one embodiment, the microstructured prototype takes the form of a silicon wafer or a polymer and can be created by molding, casting and the like. The silicon wafer is patterned with a preselected set of microstructures. Using casting, the pattern is then transferred from the silicon wafer so that the microstructure pattern is formed into silicone rubber. The silicon rubber is then provided to mold the microstructures to an engineering polymer or metal roller surface material. This engineering polymer material transfers the microstructures to material entering the roller press, such as aluminum foil. Accordingly, this forms the microstructures on the product's metal surface, such as a thin metal foil, through cold-forge molding.

The predefined patterns of microstructures can be made using a method selected from the group consisting of: photolithography, laser ablation, laser cutting, printing, engraving, machining, replication molding, electron-beam lithography, nano-imprint lithography, and any combination of these.

In one embodiment, fabricating the microstructured prototype includes the steps of: providing a semiconductor wafer, patterning the semiconductor wafer with the preselected pattern of microfeatures, molding an uncured flexible polymer to the patterned semiconductor wafer, curing the polymer, thereby forming a microstructured flexible polymer having the preselected pattern of microfeatures, removing the microstructured flexible polymer from said patterned semiconductor wafer and deforming at least a portion of said microstructured flexible polymer so as to conform the microstructured flexible polymer to at least a portion of the surface of the one or more macro scale features of said microstructured prototype.

Figure 4:
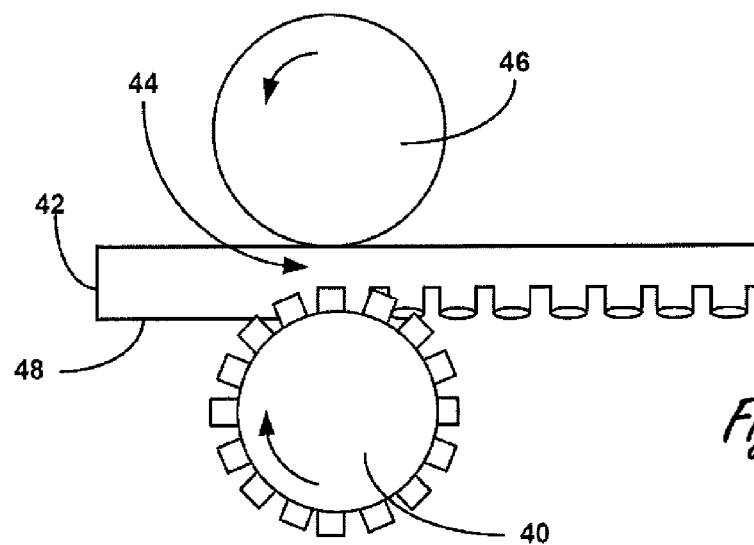
FIG. 4 is a schematic of the invention.

Referring now to FIG. 4, one embodiment, continuous single side metal surface microstructuring, is shown using a microstructured roller 40. A product having a metal surface, such as a metal foil 42, enters the compression zone 44 of two opposing rollers 40 and 46. One roller 46 is smooth while one roller 40 is microstructured. As the metal foil exits the compression zone, the metal surface 48 of the foil that was molded to the microstructured roller is microstructured while the face of the foil that was pressed onto the smooth roller remains smooth. More rollers downstream of the microstructured metal foil can further press the foil. The downstream rollers can press more of the same microstructures into the foil, different microstructures into the roller, or can press the foil with smooth rollers to alter the existing microstructures on the metal foil.

Figure 5:
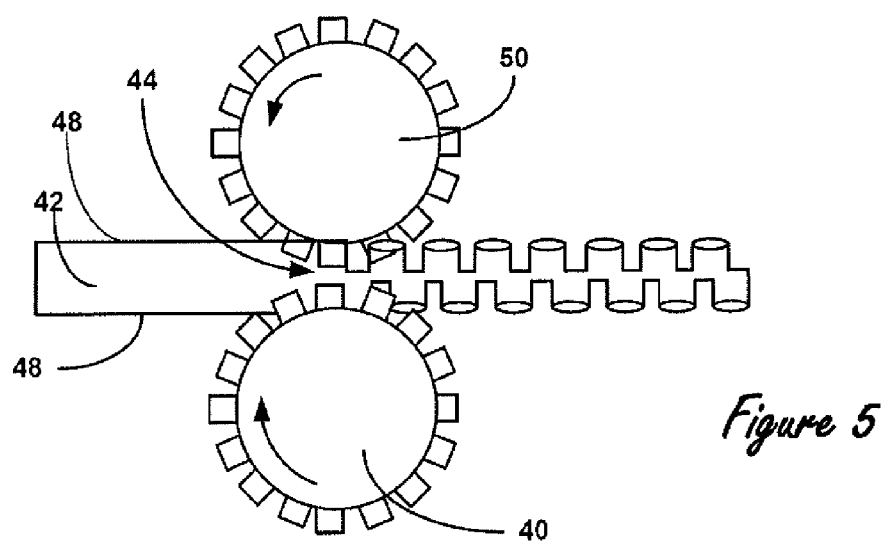
FIG. 5 is a schematic of the invention.

Referring to FIG. 5, continuous double side metal foil microstructuring using a first microstructured roller 40 and a second microstructured roller 50 is shown. Smooth metal foil enters the compression zone 44 of the two opposing microstructured rollers. As the metal foil exits the compression zone, both faces of the foil are microstructured. More rollers downstream of the microstructured metal foil can further press the foil. The downstream rollers can press more of the same microstructures into the foil, different microstructures into the roller, or can press the foil with smooth rollers to alter the existing microstructures on the metal foil.

Figure 6A:
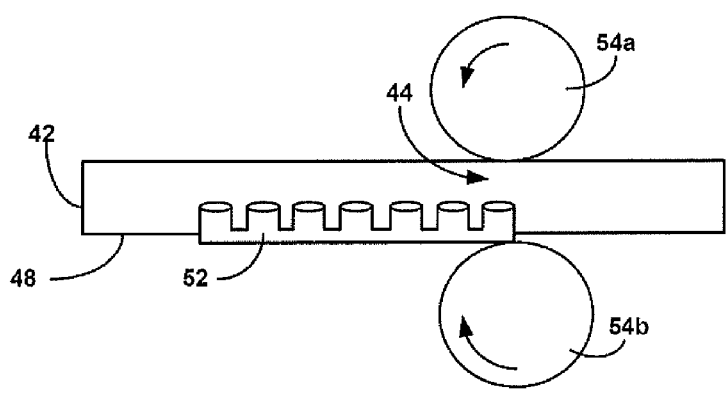
FIGS. 6A, 6B and 6C are schematics of the invention.
Figure 6B:
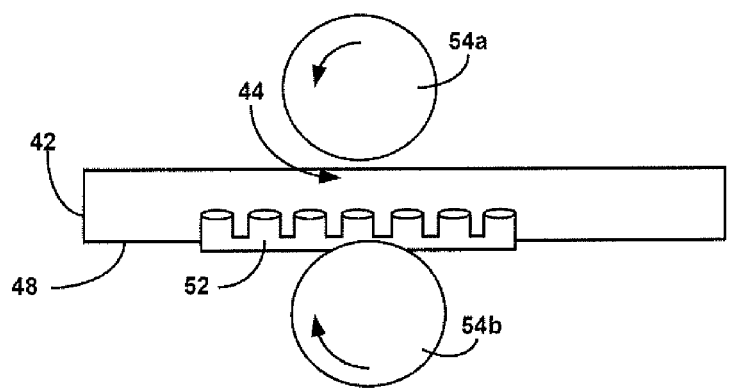
Figure 6C:
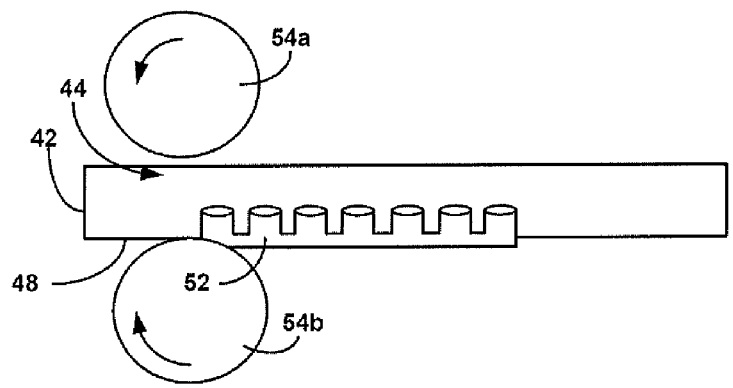

Referring to FIG. 6A, continuous microstructuring of a product having a single metal surface, such as a metal foil, using flat microstructured master 52 (transfer tool) and smooth rollers 54a and 54b. Product 42 having metal surface 48 enters compression zone 44 of the two opposing smooth rollers with the flat microstructures master inserted between the rollers. The smooth rollers turn and push the microstructured master and foil through the compression zone as shown in FIG. 6B. When the flat microstructured master travels past the rollers as shown in FIG. 6C, the flat master can be released and returned to the entrance of the compression zone as shown in FIG. 6A. The process can be repeated to create a continuously microstructured metal foil. More rollers downstream of the microstructured metal foil can further press the foil. The downstream rollers can press more of the same microstructures into the foil, different microstructures into the roller, or can press the foil with smooth rollers to alter the existing microstructures on the metal foil.

In other embodiments, the transferring of the microfeatures to the product having a metal surface using the transfer tool can include hot rolling, cold rolling, foil rolling, ring rolling, roll bending, roll forming and controlled rolling.

In one embodiment, a microstructured metal electrode is created from the microstructured intermediate using a method selected from the group consisting of electroforming, metal injection molding, and embossing. The transfer tool can then be created by electro discharge machining. In another embodiment, a ceramic form can be created from said microstructured intermediate and a metal form can be created from said ceramic form for transferring said microfeatures to said metal surface.

During the manufacturing process provided for in the present invention, the microstructure on the metal surface of the product can be deformed in a manner from the group of: taller, shorter, wider, narrower, varied spacing, larger, smaller, and jagged edges. These deformations can result in the peaks of microfeature on the metal surface not being uniform, but rather jagged. Such features can provide for further physical properties, such as enhanced hydrophobic properties since they can result in larger microstructure tops than bottoms as shown by 14 in FIG. 1 as well a the "jagged tops" shown as 15.

In one preferred embodiment, the transfer tool is a cylinder of engineering polymer or metal covered with microstructures and formed into a roll for a two-roll mill. The distance between rolls is adjusted to change the depth of the structures transferred onto the foil. Aluminum foil, or other thin metal foil, is then calendar rolled between the microstructured surfaces, imprinting one side with the desired microstructures.

In one embodiment, the transfer tool is an engineering plastic including polyphenyl sulfone. The transfer tool, using this material, can be molded from the other high-performance materials in the manufacturing process and is hard enough to imprint metal foils, such as aluminum, at room temperature. Other engineering plastics could also be used in this application, for example, a self-reinforced polyphenylene. Other engineering plastics contemplated for use in the present invention include: Acrylonitrile butadiene styrene (ABS), Polycarbonates (PC), Polyamides (PA), Polybutylene terephthalate (PBT), Polyethylene terephthalate (PET), Polyphenylene oxide (PPO), Polysulphone (PSU), Polyetherketone (PEK), Polyetheretherketone (PEEK), Polyimides, and Polyphenylene sulfide (PPS).

Figure 7A:
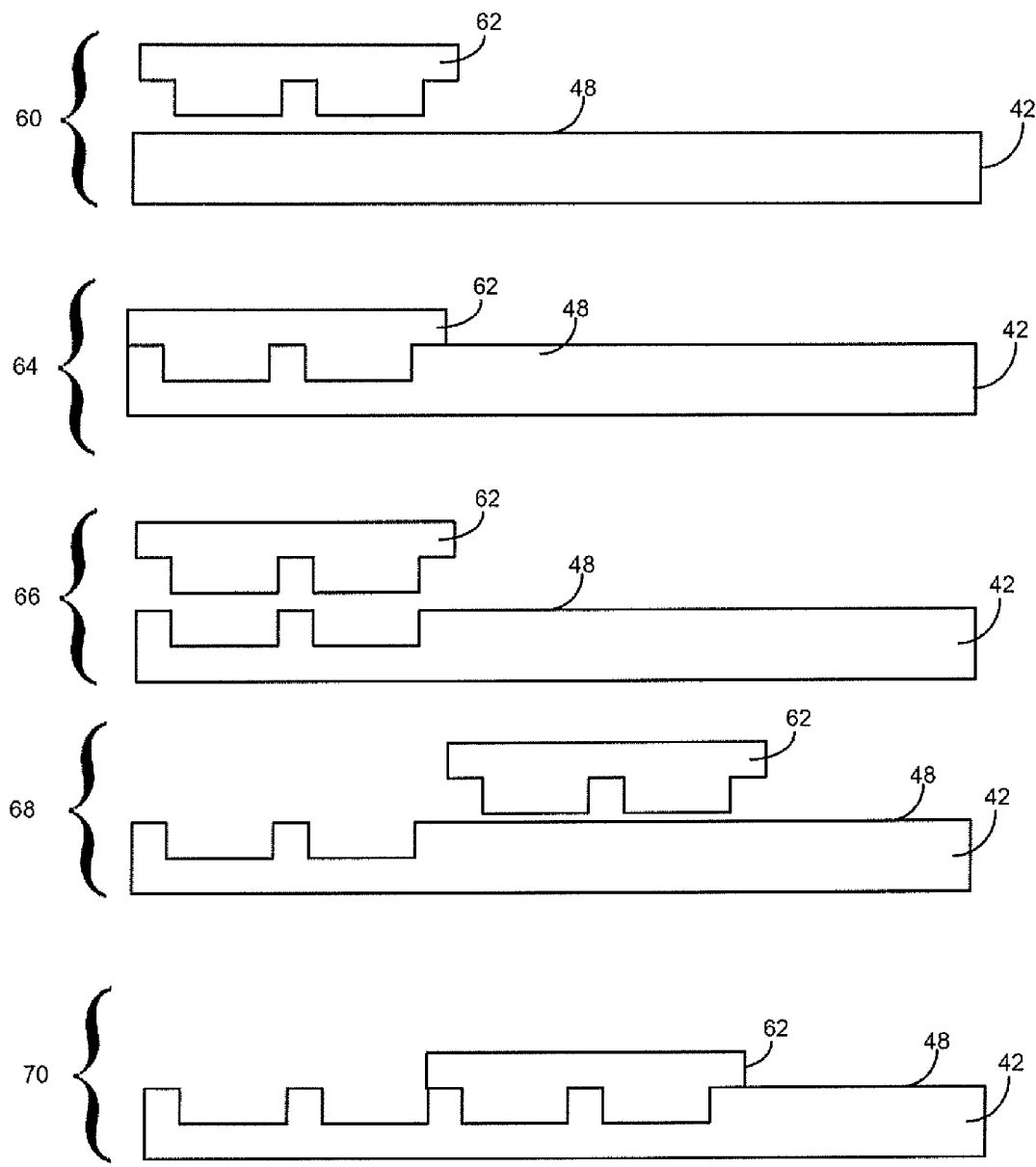
FIGS. 7A and 7B are schematics of the operation of the invention.
Figure 7B:
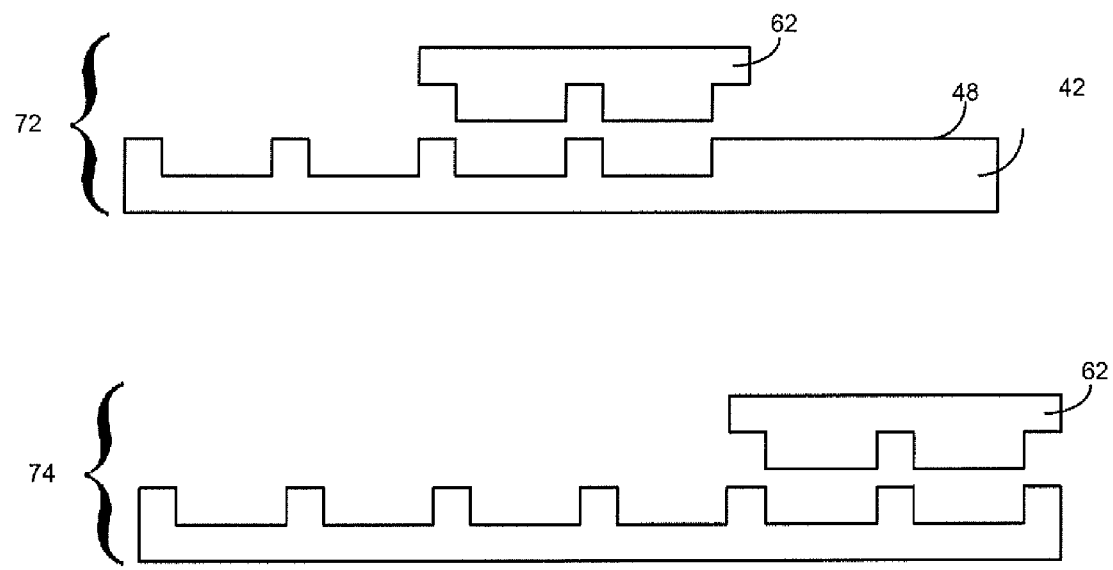

Referring to FIG. 7A, one embodiment of the present invention is shown. The process begins at 60 with a microstructured transfer tool 62 and product 42 having a metal surface 48. At 64, the microstructured transfer tool stamps the smooth foil. When the transfer tool releases the product, microstructures have been stamped into the metal surface of the product as shown at 66. At 68, the transfer tool moves or steps to a new area of the product's metal surface. At 70, the transfer tool stamps the metal surface of the product again. Referring to FIG. 7B, at 72, the transfer tool releases the product again. After a plurality of "stamp-and-step" processes, a large section of the metal surface contains microstructures as shown at 74.

Figure 8:
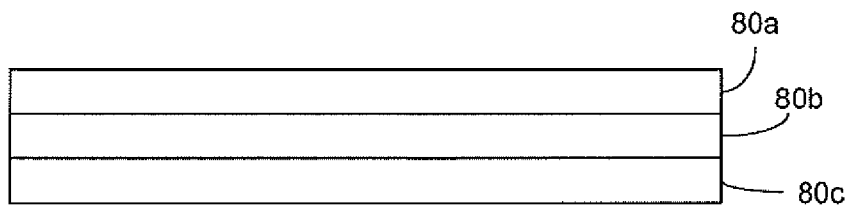
FIG. 8 is a schematic of a product.

This invention also provides for products having metal surfaces with microstructures as well as other products having metal surfaces such as metal foils for use as components in heat exchangers that can further be components in vehicles, air conditioners and consumer appliances. The metal surfaces can be made from metals that include aluminum and copper, Further, the product can be layered with a plurality of layers such as shown in 80*a* through 80*c* in FIG. 8. In one embodiment, layer 80*a* is a metal surface which layers 80*b* and 80*c* being made from the same materials. In another embodiment, layers 80*a* is a metal surface with layer 80*b* or 80*c* being a non-metallic material.

While a preferred embodiment of the invention has been described using specific terms, such description is for illustrative purposes only, and it is to be understood that changes and variations may be made without departing from the spirit or scope of the following claims.

What is claimed is:

1. A method for manufacturing a product having a metal surface comprising the steps of:
    fabricating a microstructured prototype having microfeatures selected from a set of predefined patterns of microstructures, wherein the selected pattern of microfeatures has defined dimensions;
    creating a microstructured intermediate from said microstructured prototype so that a negative of said selected pattern of microfeatures and the defined dimensions of the selected pattern are transferred to said microstructured intermediate;
    creating a transfer tool having said selected pattern of microfeatures and the defined dimensions of the selected pattern from said microstructured intermediate; and,
    transferring said selected pattern of microfeatures and the defined dimensions of the selected pattern to said metal surface by performing the steps from the group consisting of: rolling, stamping, casting, embossing or imprinting said microfeatures to said metal surface using said transfer tool so that a negative of said selected pattern and the defined dimensions of microfeatures are imprinted on the metal surface of said product so that said metal surface includes said selected pattern of microstructures; and
    wherein said step of transferring said microfeatures to said metal surface includes the step of transferring said microfeatures to said metal surface so that said resulting microstructures on said metal surface are deformed when compared to said defined dimensions of the selected pattern of microfeatures on said transfer tool.

2. The method of claim 1 wherein said microstructured prototype is a silicon wafer.

3. The method of claim 1 wherein said microstructured prototype is a polymer.

4. The method of claim 3 wherein said microstructured prototype is created by molding.

5. The method of claim 3 wherein said microstructured prototype is created by casting.

6. The method of claim 4 wherein said microstructured prototype is a silicon wafer.

7. The method of claim 5 wherein said microstructured prototype is a silicon wafer.

8. The method of claim 3 wherein said microstructured intermediate is made from the group comprising of thermoplastic, thermoplastic polymer, thermoset, and rubber.

9. The method of claim 8 wherein said microstructured intermediate is created by casting said rubber microstructured intermediate using said microstructured prototype.

10. The method of claim 1 wherein:
    said step of creating a transfer tool having said microfeatures from said microstructured intermediate includes
    creating said transfer tool that is a cylindrical engineered polymer used for roll milling; and,
    transferring said microfeatures to said metal surface of said product includes the steps of rolling said microfeatures to said metal surface using said transfer tool so that a negative of said microfeatures are imprinted on said metal surface of said metal foil.

11. The method of claim 10 wherein said transfer tool is created from a material from the group consisting of: polyphenyl sulfone, self-reinforced polyphenylene, Acrylonitrile butadiene styrene (ABS), Polycarbonates (PC), Polyamides (PA), Polybutylene terephthalate (PBT), Polyethylene terephthalate (PET), Polyphenylene oxide (PPO), Polysulphone (PSU), Polyetherketone (PEK), Polyetheretherketone (PEEK), Polyimides, and Polyphenylene sulfide (PPS).

12. The method of claim 10 including transferring said microfeatures to said metal surface using rolling from the group consisting of: hot rolling, cold rolling, foil rolling, ring rolling, roll bending, roll forming and controlled rolling.

13. The method of claim 10 wherein:
    said product includes a plurality of metal surfaces;
    said step of creating a transfer tool having said microfeatures from said microstructured intermediate include creating a plurality of cylindrical engineered polymers used for roll milling having microfeatures transferred from said microstructured intermediate; and,
    transferring said microfeatures to said metal surface includes the steps of rolling said microfeatures to said plurality of metal surfaces using said transfer tool so that said negative of said microfeatures are imprinted on said plurality of said metal surfaces of said product.

14. The method of claim 1 including the step of manufacturing a heat exchanger using said product.

15. The method of claim 14 wherein said heat exchanger is a component from the group of: a vehicle, an air conditioner, and a consumer appliance.

16. The method of claim 1 wherein said steps of creating said transfer tool having said microfeatures from said microstructured intermediate includes the steps of:
    creating a microstructured metal electrode from said microstructured intermediate from a method selected from the group consisting of electroforming, metal injection molding, and embossing; and,
    electro discharge machining a microstructured metal transfer tool from said microstructured metal electrode.

17. The method of claim 1 wherein said steps of creating said transfer tool having said microfeatures from said microstructured intermediate includes the steps of:
    creating a ceramic form from said microstructured intermediate; and,
    creating a metal form from said ceramic form for transferring said microfeatures to said metal surface.

18. The method of claim 1 wherein said predefined pattern of microstructures is made using a method selected from the group consisting of: photolithography, laser ablation, laser cutting, printing, engraving, machining, replication molding, electron-beam lithography, nano-imprint lithography, and any combination of these.

19. The method of claim 1 wherein fabricating said microstructured prototype includes the steps of: providing a semiconductor wafer, patterning the semiconductor wafer with said preselected pattern of microfeatures, molding an uncured flexible polymer to the patterned semiconductor wafer, curing the polymer, thereby forming a microstructured flexible polymer having said preselected pattern of microfeatures, removing said microstructured flexible polymer from said patterned semiconductor wafer and deforming at least a portion of said microstructured flexible polymer so as to conform the microstructured flexible polymer to at least a portion of the surface of the one or more macro scale features of said microstructured prototype.

20. The method of claim 1 wherein said product is a metal foil.

21. The method of claim 20 wherein said product is a laminate of a plurality of different layers comprising different materials.

22. The method of claim 21 wherein one of said different layers is non-metallic.

23. The method of claim 1 wherein one of said microfeatures include physical properties from the group of: hydrophobic, superhydrophobic, hydrophilic, superhydrophillic, oleophobic, and superoleophobic.

24. The method of claim 1 wherein said microfeatures on said metal surface are deformed, as compared to said microfeatures on said transfer tool, in a manner from the group of: taller, shorter, wider, narrower, varied spacing, larger, smaller, and jagged edges.

* * * * *